US008335720B2

(12) United States Patent
Juang et al.

(10) Patent No.: US 8,335,720 B2
(45) Date of Patent: Dec. 18, 2012

(54) SYSTEM, METHOD, AND COMPUTER PROGRAM PRODUCT FOR INCREASING INVENTORY TURNOVER USING TARGETED CONSUMER OFFERS

(75) Inventors: David Juang, Forest Hills, NY (US); Rajendra R. Rane, Woodbridge, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1650 days.

(21) Appl. No.: 11/501,914

(22) Filed: Aug. 10, 2006

(65) Prior Publication Data
US 2007/0179836 A1    Aug. 2, 2007

Related U.S. Application Data

(60) Provisional application No. 60/706,748, filed on Aug. 10, 2005.

(51) Int. Cl.
*G06Q 30/00* (2012.01)
(52) U.S. Cl. .................... 705/14.53; 705/7.29; 705/14.1; 705/14.13; 705/14.24; 705/14.25; 705/14.4; 705/14.41; 705/14.49; 705/14.61; 705/14.66; 705/26.7; 705/28
(58) Field of Classification Search .................. 705/5, 7, 705/10, 14.1, 14.24
See application file for complete search history.

(56) References Cited

U.S. PATENT DOCUMENTS

| | | | |
|---|---|---|---|
| 6,741,969 B1* | 5/2004 | Chen et al. .................. | 705/14.27 |
| 2002/0052776 A1* | 5/2002 | Rothman et al. ................ | 705/10 |
| 2003/0149602 A1* | 8/2003 | Francis ............................. | 705/5 |
| 2006/0242039 A1 | 10/2006 | Haggerty et al. | |

OTHER PUBLICATIONS

Healey, James R. "A Roaring Comeback // Hyundai Revs up for Change as Sales Soar," USA Today, (May 11, 1993), p. 01.B.*

* cited by examiner

*Primary Examiner* — Elizabeth Rosen
(74) *Attorney, Agent, or Firm* — Snell & Wilmer L.L.P.

(57) ABSTRACT

Consumer, merchant, and transactional data from a closed loop network and external sources may be leveraged to increase demand of a merchant's inventory during normally low-demand periods. Extensive data mining is used to determine the excess merchant inventory and demand patterns at different times and different locations for merchants and groups of merchants. Similar data mining is used to analyze cardmember demand patterns to identify the cardmember preferences regarding when and where they which to purchase goods and/or services. Cardmembers may also be grouped based on their demand patterns. Using pricing as a lever, cardholders with specific preferences are targeted to shift the demand from peak periods and locations to non-peak periods and locations, and to increase the non-peak demand by location as well as time period. Higher precision may be obtained using product level transaction data from point-of-sale terminals used by merchants wherever applicable.

24 Claims, 13 Drawing Sheets

SYSTEM, METHOD, AND COMPUTER PROGRAM PRODUCT FOR INCREASING INVENTORY TURNOVER USING TARGETED CONSUMER OFFERS

CROSS-REFERENCE TO RELATED APPLICATIONS

The present application claims the benefit of U.S. Provisional Patent Application No. 60/706,748, filed Aug. 10, 2005, which is incorporated by reference herein in its entirety.

BACKGROUND OF THE INVENTION

1. Field of the Invention

The present invention relates to targeted consumer marketing.

2. Background Art

Many industries, such as restaurants, hotels, and theatres have fixed capacity and uneven demand patterns. In the periods where the demand is below the capacity, the merchant has excess inventory that will perish quickly. The perishable inventory may include unused tables at a restaurant, unoccupied rooms at a hotel, or empty seats at a theatre. If not utilized, this inventory will produce zero returns. Merchants in the past have tried to solve this problem by offering broad-based discounts to spur demand during low-demand periods. For example, some retail merchants have off-season discount sales. As another example, some airline providers sells unsold seats at a discount over the Internet. This broad-based approach, however, results in a low success rate, because the ratio of number of offers to number of acceptances is high. Further, notification of these broad-based discounts is usually only available to existing customers of a merchant or individuals geographically located near the merchant.

BRIEF SUMMARY OF THE INVENTION

Through extensive mining of consumer data, merchant data, and transaction data, card holder preferences can be determined. This data may be collected using a network of merchants and customers, such as the closed loop network run by American Express Corp. of New York, N.Y. Customer demand can be predicted at the micro-segment level to establish pricing that maximizes the return on fixed investment for the merchant. The demand patterns of a merchant can also be analyzed to determine periods of excess inventory of the merchant. For low-demand periods and/or low-demand locations, selected cardholders may be offered discounts to particular merchants. The discounts are customized based on cardholder shopping patterns, travel patterns, and demographics. Instead of offering broad-based discounts to everyone, this system and method enables merchants to fine-tune the level of discounts based on individual cardholder characteristics and preferences. Using pricing as a lever, the cardholders with specific preferences are targeted to shift demand from peak periods or locations to non-peak periods or locations, and to increase the non-peak demand by location as well as time period. Merchants can thereby dispose of excess inventory at the highest price, maximizing the return on investments. Cardholders also benefit, as they have the option of buying goods and/or services that fit their preferences at a discounted price.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
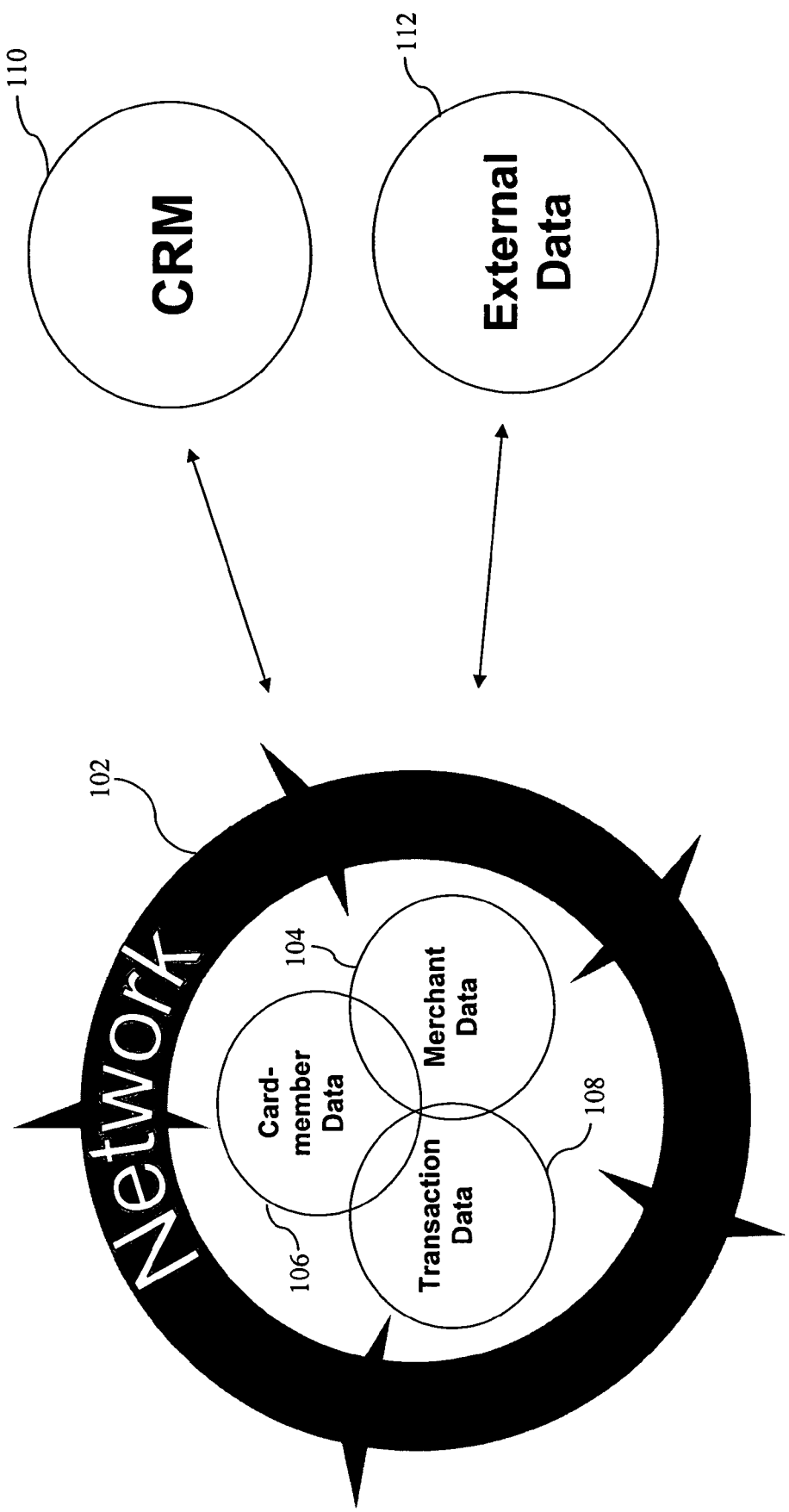
FIG. 1 is an illustration of example data sources for data mining.

The present invention will be described with reference to the accompanying drawings.

The drawing in which an element first appears is typically indicated by the leftmost digit(s) in the corresponding reference number.

DETAILED DESCRIPTION OF THE INVENTION

I. Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "consumer," "customer," "participant," "cardmember," "cardholder" and/or the plural form of these terms are used interchangeably throughout herein to refer to those persons or entities capable of accessing, using, be affected by and/or benefiting from the present invention.

Furthermore, the terms "business," "service provider," or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or can be a fob having a transponder and/or an RFID reader.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in an account associated with the card before use of the card is allowed. For example, if a customer deposits ten dollars of value into the account associated with the stored value card, the card may only be used for payments up to ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4\ N_5N_6N_7N_8\ N_9N_{10}N_{11}N_{12}\ N_{13}N_{14}N_{15}N_{16}$$

The first five to seven digits are reserved for processing purposes and identify the issuing institution, card type, etc. In this example, the last (sixteenth) digit is typically used as a checksum for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

6. RFID and Transmission of Magnetic Stripe Data

It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portion of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers, described herein, may be forwarded encoded in all or a portion of a data stream representing data encoded in, for example, track 2 or track 3 format.

II. Targeted Marketing

As shown in FIG. 1, several sources may be leveraged to gather information about consumers, merchants and the transactions between them. With a network 102, such as the closed loop network run by American Express Corp. of New York, N.Y., it is possible to gather merchant data 104, customer data 106, and transaction data 108 of transactions by a merchant and/or customer based on records from the network owner. In a closed loop network, merchant data 104 is known because of the relationship between the network owner, such as American Express, and many merchants. Cardholder data 106 is known because of the relationship between the network owner and many cardholders. When a cardholder enters into a transaction with a merchant, such as by swiping a transaction instrument through a card reader, information about that purchase is added to transaction data 108. Merchant data 104, customer data 106, and transaction data 108 need not be obtained from a closed loop network, but may be obtained from alternate sources, such as from corporate records, from information received directly from customers and merchants, or through purchase of the information from external sources. Customer relationship management ("CRM") data 110 and external data 112 may also be used to determine information about customers and merchants. External data 112 may include data provided by independent merchant rating services, such as, for example, the ratings provided by Zagat Survey, LLC, of New York, N.Y.

Merchant data includes, for example and without limitation, the location of the merchant, the merchant's industry, and the amount of inventory moved by the merchant at various days, times, and locations. Customer data includes, for example and without limitation, the types of services and products the customer uses, the merchants the customers usually purchase from, as well as spend habits and spend capacity of the customers.

Figure 2:
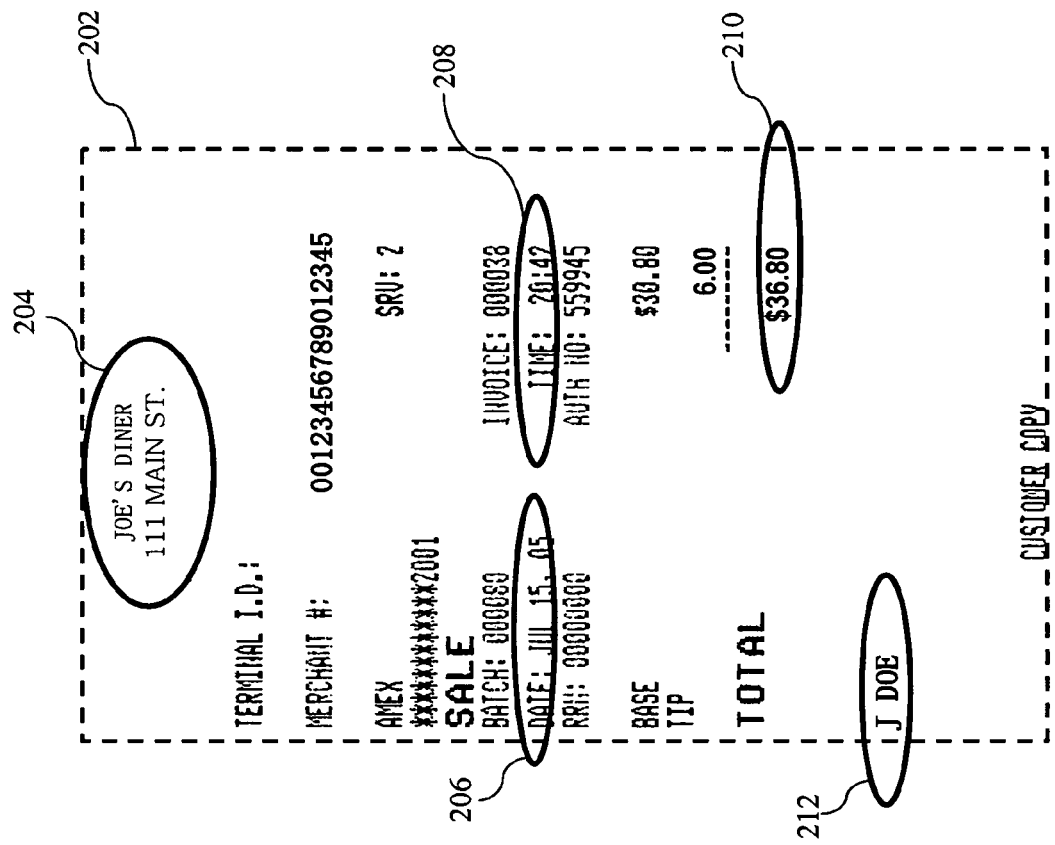
FIG. 2 is an illustration of a sample record of charge that may be used to obtain customer, merchant, and/or transaction data.

When a customer interacts with a merchant in a transaction, transaction data is produced. Simple retail purchases may result in basic transaction information, as shown in FIG. 2. FIG. 2 is an illustration of a sample receipt 202, showing the type of information that may be obtained from the simple retail purchase. Merchant name and location information 204, day of transaction 206, time of transaction 208, amount of transaction 210, and customer name 212 can all be obtained from a record of charge such as receipt 202. If the transaction is more detailed, enhanced information can also be obtained. For example, if a customer books a flight with an airline, city pairs and dates of departure and/or return may be obtained in addition to the basic transaction information.

Most of the consumer transaction data comes from data collected when the customer's transaction account is used, such as, for example, when the customer uses a credit card. However, a reasonable assumption can be made that consumers paying by cash or check exhibit similar purchasing patterns as consumers paying by, for example, a credit card.

Figure 3:
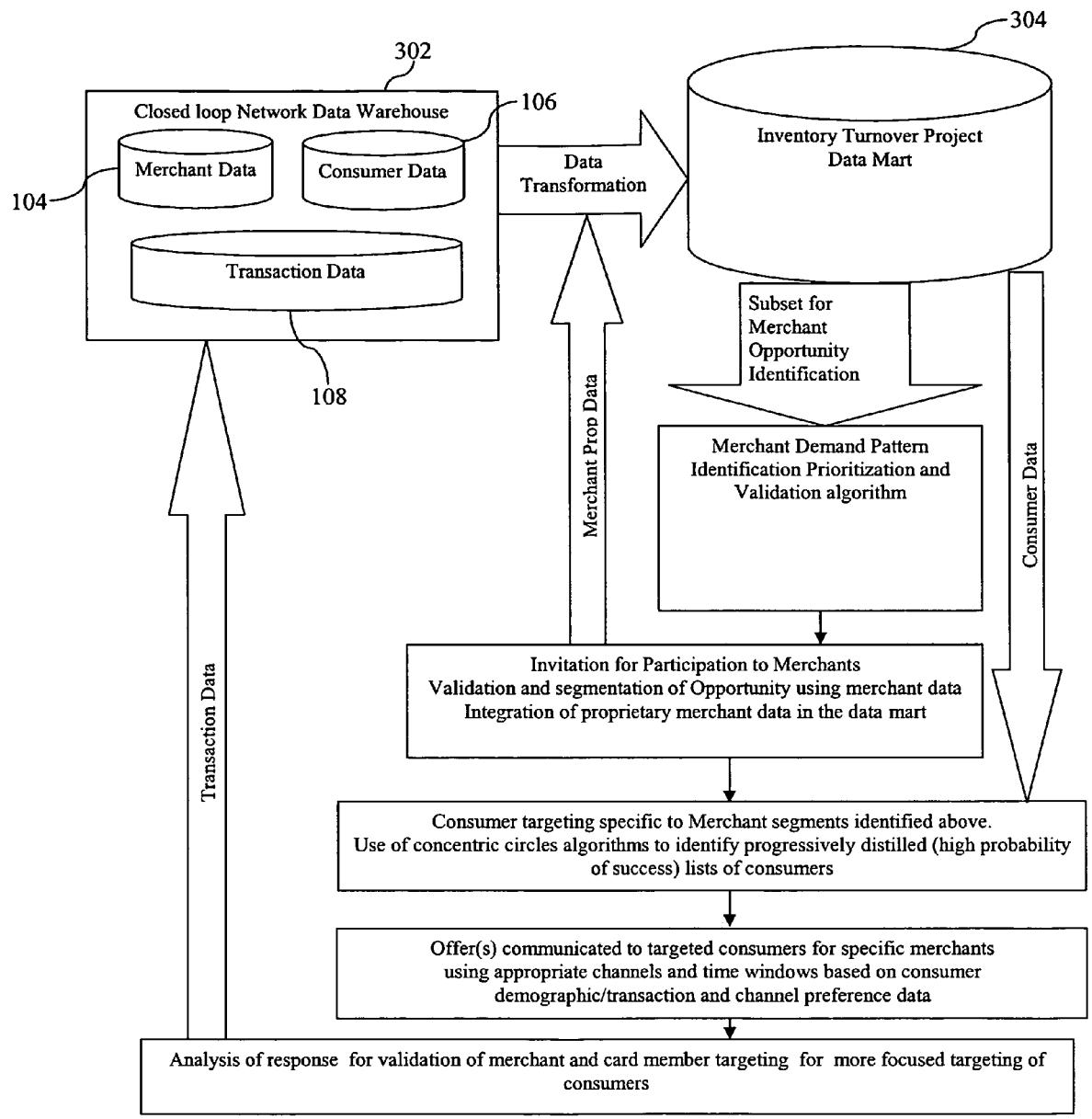
FIG. 3 is a flowchart illustrating an example method by which customers may be targeted according to an embodiment of the present invention.

All this merchant, consumer, and transaction data may be stored in a database, referred to herein as a data warehouse. Extensive data mining can be performed on the information in the data warehouse to match potential customers with merchants. FIG. 3 is a flowchart illustrating the method in which data is taken from the data warehouse and processed to produce a set of targeted customers for particular merchants. As shown in FIG. 3, data warehouse 302 stores merchant data 104, consumer data 106, and transaction data 108. Data warehouse 302 may exist, for example, on a computer usable medium.

Much of the collected data in data warehouse 302 is not useful for targeting analysis. Useful data is thus taken out of data warehouse 302 and transformed so that it is easy to analyze. This data is stored in a database specific to the application, referred to herein as a data mart. Much like a data warehouse is a collection of a wide variety of information relating to a wide variety of applications, a data mart is a smaller collection of data specific to a particular application. For example, if it is useful to identify customers who would be most likely to respond to a discount offered by a particular merchant at a low-demand period of the merchant, the data may be stored in an inventory turnover data mart 304 that contains information relevant to inventory turnover. Data mart 304 may be stored, for example, on a computer usable medium. In data mart 304, the merchant data, consumer data, and transaction data are reorganized for the specific purpose of the analysis.

Merchant information may be extracted from data mart 304. To the extent that merchant information is combined with related transaction information, merchant data and transaction data are segmented. The segmentation may be based, for example and without limitation, on time, industry, location, complementary merchants, and/or competing merchants to identify inventory turnover opportunities using a merchant demand pattern identification prioritization and validation algorithm.

An inventory turnover opportunity exists when a merchant has low demand, also referred to as excess inventory. Excess inventory occurs when the merchant has more of its product than is wanted by its consumers. Excess inventory may include extra units of a product if the merchant is a manufacturer or retailer. Excess inventory may also include empty tables at a restaurant, empty seats on an airplane, or empty rooms in a hotel. Some merchants have very little excess inventory, and thus may not need to target customers for discounted business. In some cases, it may be desired to target existing customers to shift demand from peak periods and locations to non-peak period and locations, such as when the demand for a good or service is greater than the inventory at a particular time or location. In other cases, it may be desired to target potential customers to add to the non-peak demand for a location or time period. Although restaurants will be used as an example herein, one of skill in the pertinent art(s) will recognize that the process applies in a similar manner to any merchant of goods and services, such as and without limitation, a manufacturer, an airline company, a retailer, an entertainment company such as a theatre or cineplex, and a hotel company.

Figure 4B:
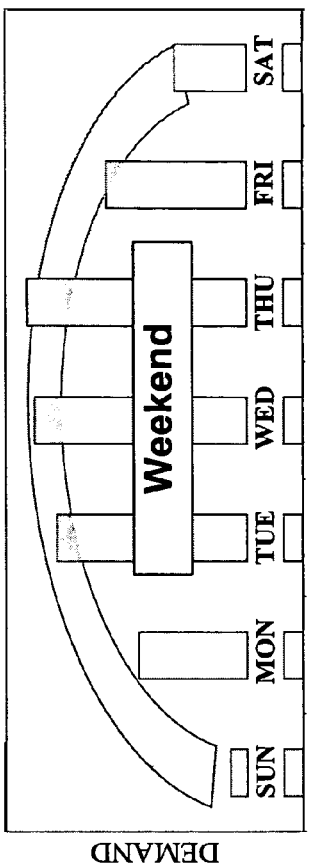
FIGS. 4A-4D are charts illustrating demand for example individual restaurants on a per-day basis.
Figure 4D:
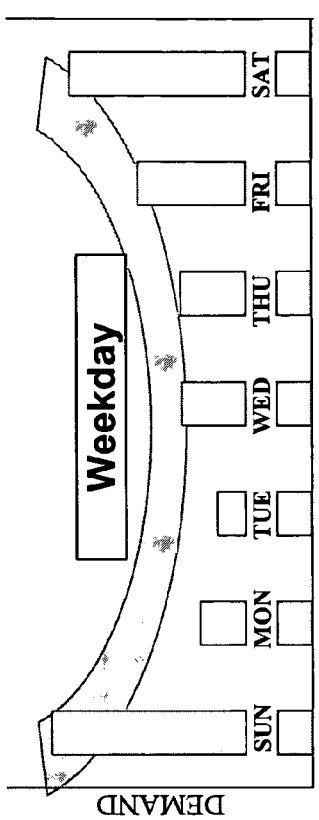
Figure 4A:
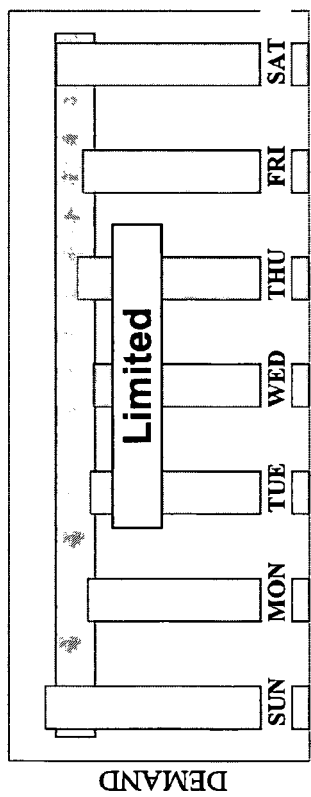

In the restaurant example, certain high-end restaurants may be in such high demand that they do not suffer from a lack of reservations during specific times. FIG. 4A is a chart showing the demand for an example high-demand Restaurant #1. As shown, the demand for Restaurant #1 is fairly even, and there are no real periods of low demand. Other merchants may have periods of low demand and could benefit by offering discounts to customers willing to purchase their products or services during those low demand periods. These merchants may be identified using a merchant demand pattern algorithm. Such an algorithm analyzes the merchant data to determine, for example, the dates and times that the merchant posts the most and/or least revenue. The algorithm may also compare similar establishments with a similar customer base and/or similar locations to identify demand patterns.

Figure 4C:
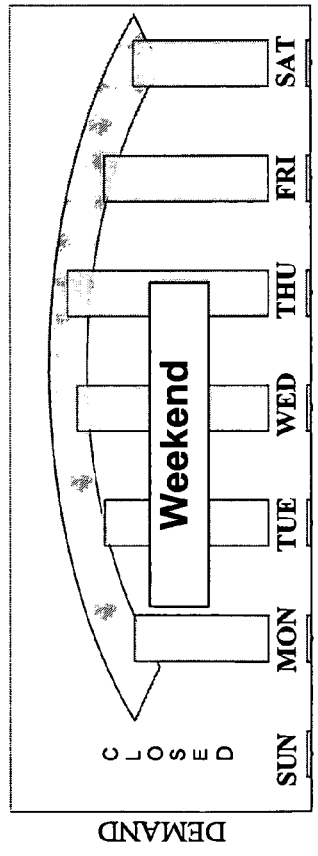

Following the restaurant example, other restaurants may experience low demand periods on certain days of the week. FIGS. 4B and 4C are charts showing the demand per day for sample Restaurant #2 and sample Restaurant #3, respectively. As shown, Restaurant #2 and Restaurant #3 experience high demand in the middle of the week. However, Restaurant #2 experiences periods of low demand on Saturdays and Sundays. Similarly, Restaurant #3 experiences periods of low demand on Saturdays and Mondays, as it is closed on Sundays. Restaurant #2 and Restaurant #3 are thus identified as merchants having an opportunity to benefit from an inventory turnover program on weekends. FIG. 4D is a chart showing demand per day of another sample Restaurant #4, which has high demand on the weekends, but low demand on weekdays. Restaurant #4 is thus identified as a merchant having an opportunity to benefit from inventory turnover assistance on weekdays.

Figure 5A:
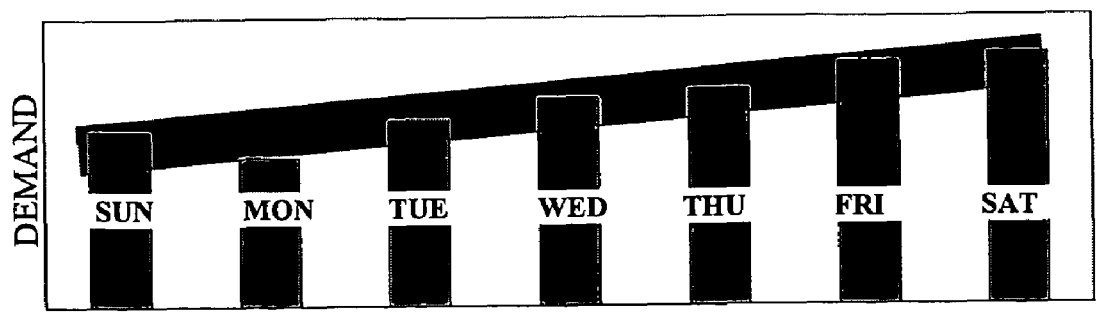
FIGS. 5A-5C are charts illustrating demand for restaurants across example geographic areas on a per-day basis.
Figure 5B:
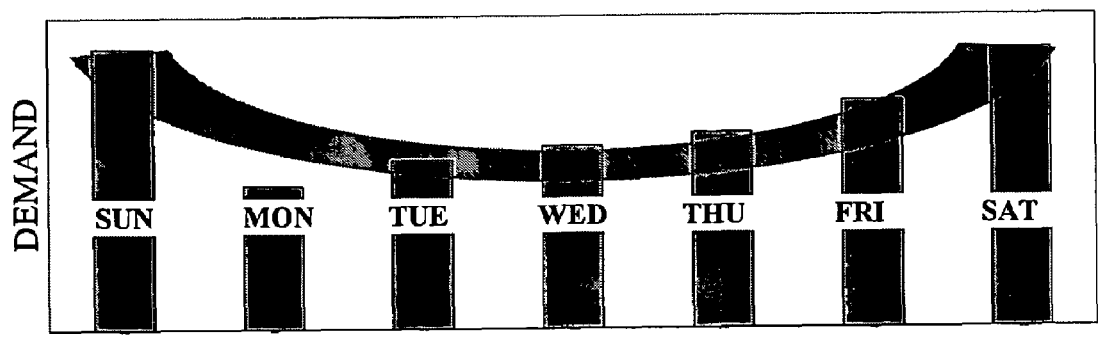
Figure 5C:
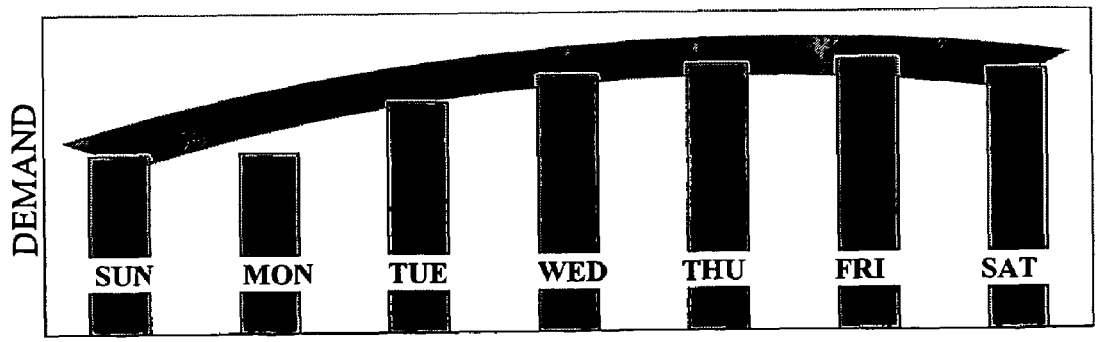

Low-demand periods may also vary by geography. For example, as shown in FIG. 5A, restaurants in the New York City metro area may generally experience a low-demand period on Mondays. When the geographical location is narrowed down to Brooklyn, restaurants may generally experience a low-demand period during weekdays, as shown in FIG. 5B. When the geographical location is narrowed down to Manhattan, restaurants may generally experience a low-demand period during Sundays and Mondays, as shown in FIG. 5C.

Figure 6A:
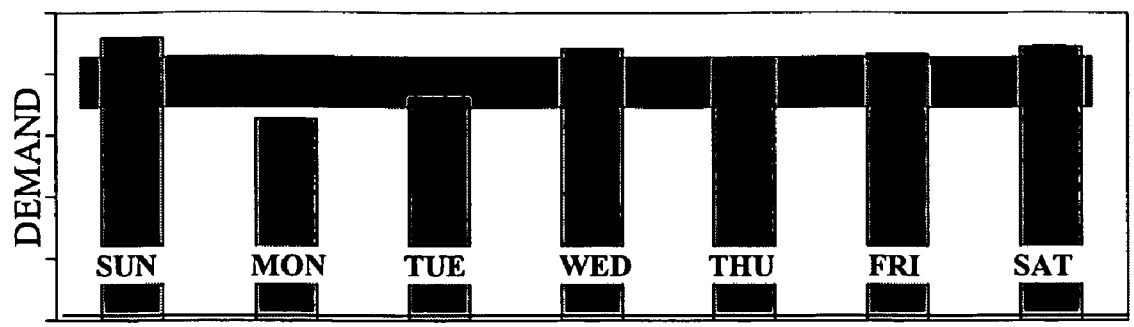
FIGS. 6A-6C are charts illustrating demand for restaurants across example neighborhoods on a per-day basis.
Figure 6B:
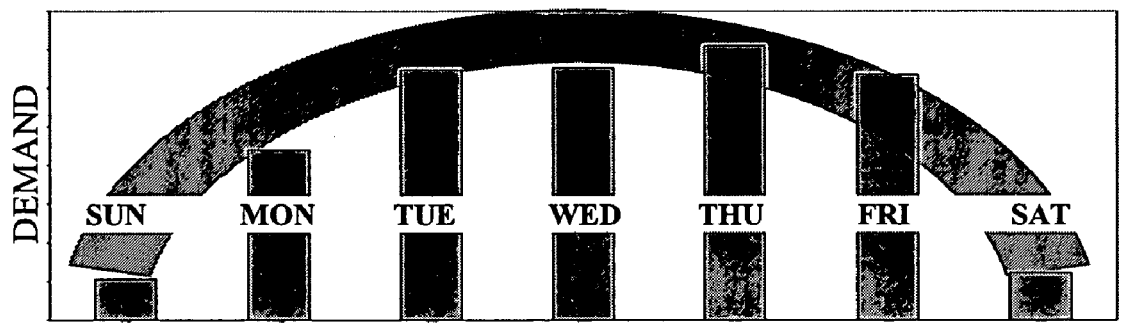
Figure 6C:
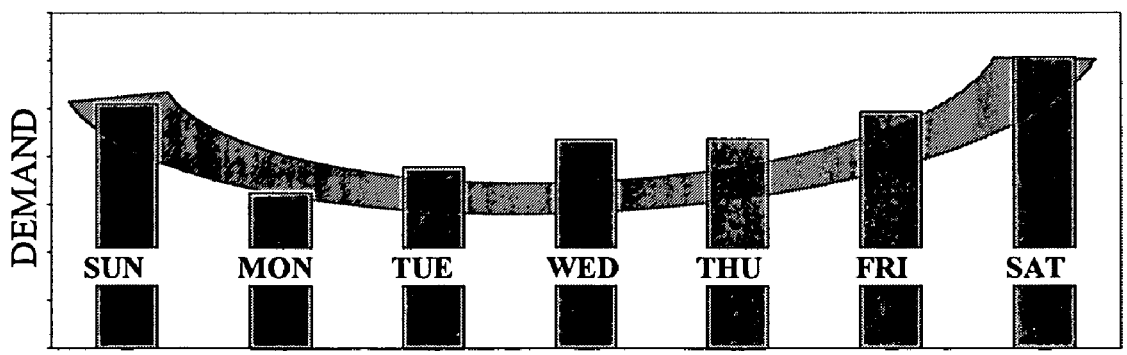

The geographic locations can be further narrowed down and analyzed by neighborhoods. For example, as shown in FIG. 6A, restaurants on the Upper East Side of New York City experience low-demand periods, and thus excess capacity, on Mondays. As shown in FIG. 6B, restaurants in the financial district of New York City may generally experience low-demand periods on weekends. As shown in FIG. 6C, restaurants in the Central Park West neighborhood of New York City may generally experience low-demand periods on weekdays.

Low-demand periods may also vary by time of day or month of year. Following the restaurant example, although some restaurants may be very busy in a time slot between 8:00 pm and 11:00 pm, the restaurants may have available seating during the time slot between 6:00 pm and 8:00 pm. In another example, some retailers experience a low-demand period following holidays. In yet another example, merchants in the entertainment industry (such as a theatre) may experience low demand on non-Friday weekdays. In still another example, a manufacturer, such as an electronics company, may experience lower demand at all times because a competitor has taken over part of the market.

As mentioned above, merchants that have periods of low demand (excess inventory) are identified based on the merchant information from network 102 and other sources such as CRM data 110 and external data 112 that are stored in data mart 304. Once such merchants are identified, the merchants may be contacted with the information about their demand patterns. Alternatively, merchants may request that an inventory turnover analysis be performed for them. If the merchant accepts inclusion in the inventory turnover program, that merchant's point-of-sale ("POS") data may be integrated into data mart 304. POS data is useful because it contains information that may not be found in other types of data in data mart 304. For example, although transaction data may be obtained through purchase records or records of charge of the cardholder, those records do not include a record of the specific items purchased by the cardholder. Specific information may be kept, however, in the POS data records kept internally by the merchant. For example, a transaction card provider may know from records of charge that a cardholder purchased music at a music store, but the music store POS records will show that the card holder actually purchased classical music at the music store. Adding this POS data to data mart 304 results in a more powerful and more accurate targeting of customers most likely and willing to respond to an offer by the merchant. POS data from the merchant can also be used to validate and segment the opportunity of the merchant to benefit from the inventory turnover program. If the merchant is willing to forego some of the profits made through discounts that would bring in additional customers in exchange for having more customers at low-demand times, customers whose needs and preferences match those of the merchant can be targeted for marketing.

Figure 7A:
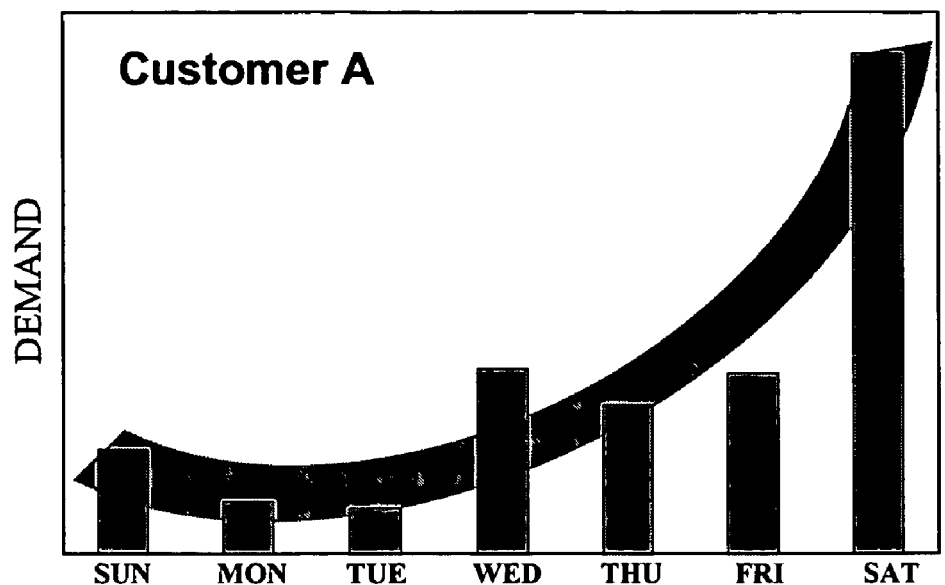
FIGS. 7A-7B are charts illustrating demand by an example customer on a per-day and per-hour basis, respectively.
Figure 7B:
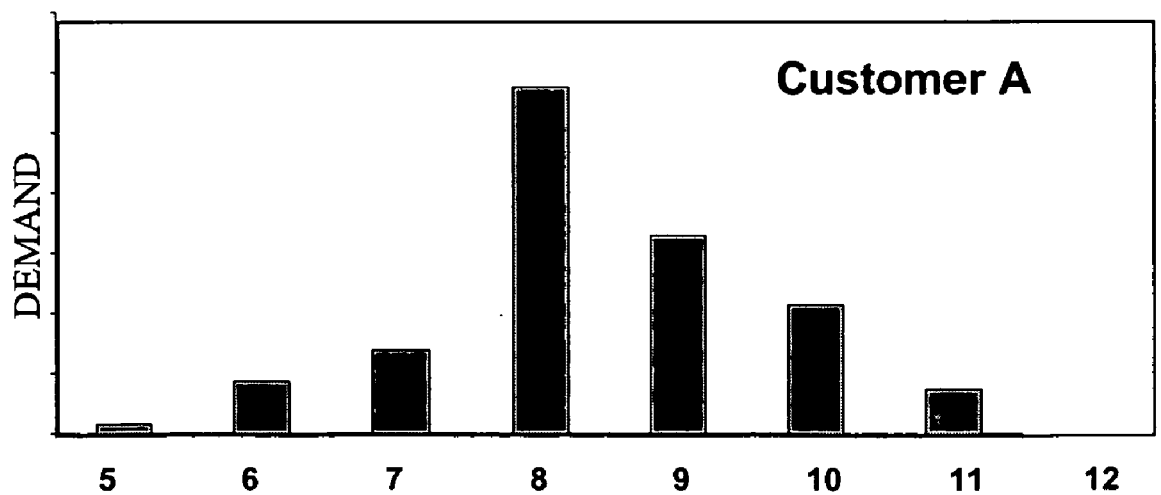
Figure 7C:
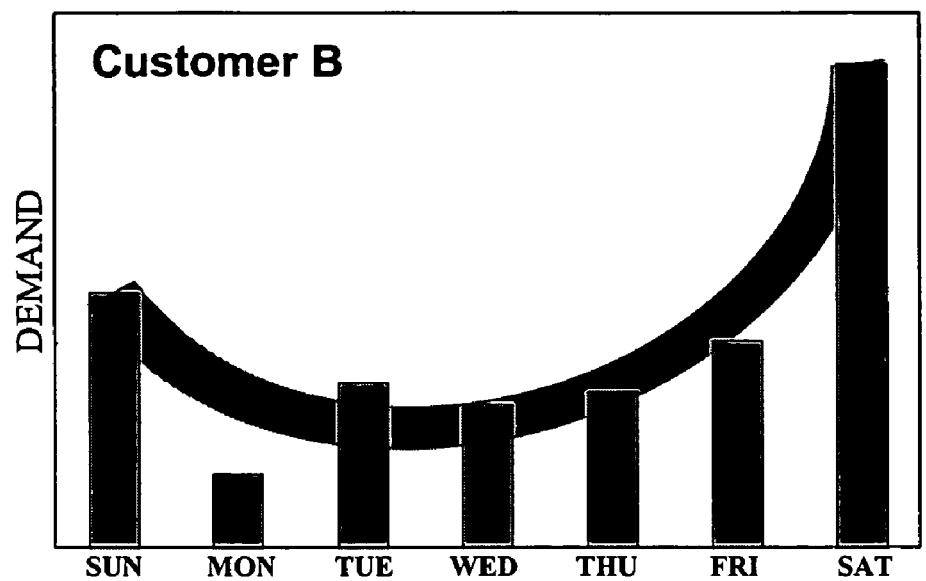
FIGS. 7C-7D are charts illustrating demand by another example customer on a per-day and per-hour basis, respectively.
Figure 7D:
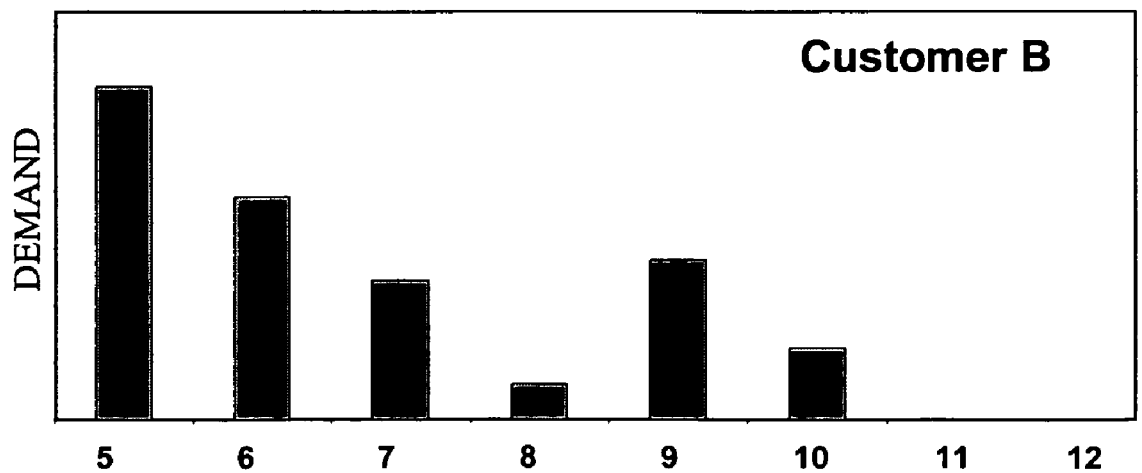

Consumer data from data mart 304 is therefore analyzed to determine which cardholders are most likely to take advantage of a discount offer by the merchant at a particular time or location. Such information can be gleaned from spending patterns of the cardholder. For example, if a cardholder typically makes retail purchases on a certain day of the week, that cardholder may be likely to take advantage of a discount offered at a retail store on the same day of the week. As shown in FIGS. 7A and 7B, a Customer A may make most of his purchases related to the industry of the interested merchant on Saturdays at 8:00 p.m. This information can be determined by reviewing the purchase history of Customer A. In contrast, as shown in FIGS. 7C and 7D, a Customer B may also make most of his purchases related to the industry of the interested merchant on Saturday, but around 5:00 p.m. If the interested merchant has excess capacity in the early evenings on Saturdays, such consumer data will indicate that Customer B would be most likely to accept an offer for discounted purchases from the merchant in the early evenings on Saturdays.

Cardholders may also be analyzed based on data from competing merchants and/or complementary merchants. Competing merchants are those who are in direct competition with a given merchant and whose products and/or services typically replace those of the given merchant. Complementary merchants are those whose products and/or services are typically sold to similar consumer groups and enhance, but do not replace, products and/or services provided by the given merchant. For example, if a merchant experiencing a low-demand period is a hotel in a particular city, data regarding customers who may need overnight accommodations in that city may be obtained from an airline company offering flights to that city. Similarly, if the merchant experiencing a low-demand period is a restaurant, data regarding customers who may accept discounted meal offers may be obtained from a hotel near the restaurant.

In this manner, data from data mart 304 is processed to identify customers most likely to accept an offer from a particular merchant during that merchant's low-demand period. One type of algorithm that may be used is a concentric circles algorithm. A concentric circles algorithm primarily uses the consumer transaction information available from a record of charge from swiping a card for making payments. Any other form of transaction information identifiable with the individual customer that captures consumer identification, merchant identification, and/or details of the transaction including time, date, amount, location, and/or detailed or aggregated information about the goods or services bought and sold through that transaction may also be used. This algorithm may also use demographic information about the merchant and the consumer. The demographic information may be obtained from internal sources as well as data vendors who maintain and supply detailed personal databases of large numbers of consumers across the world.

The POS data from the merchant gives further merchant-specific details of the transaction. For example, a retailer may have additional details related to a single transaction such as the list of retail goods and the quantities as well as unit prices of each of the retail goods purchased by a consumer during a single transaction. This data may be proprietary or owned by the merchant, and may or may not be available to the algorithm. However, the algorithm may be designed to use this data whenever available.

Figure 8:
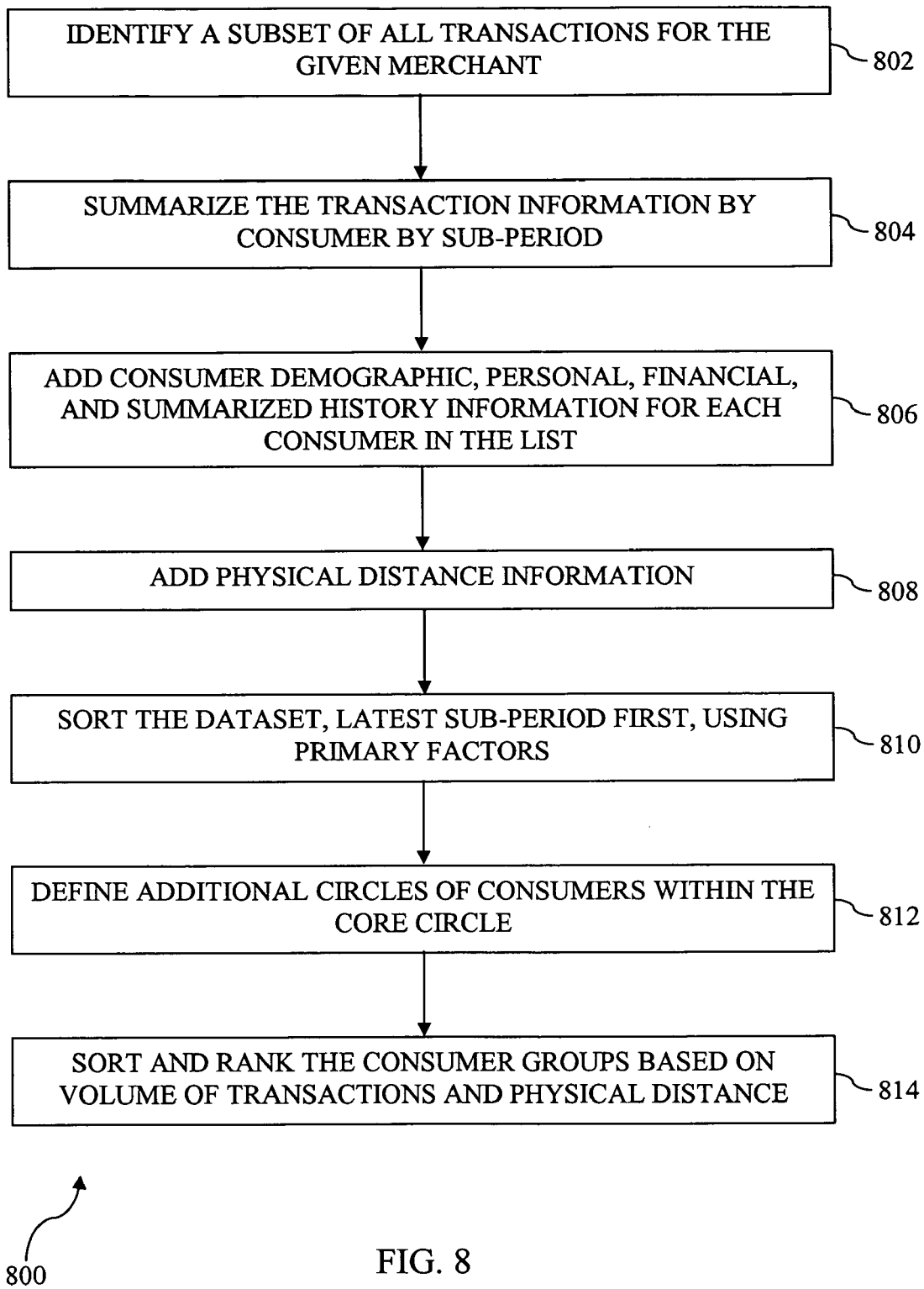
FIG. 8 is a flowchart of a method for processing data according to an example concentric circles algorithm.

The algorithm considers the most probable set of customers who may be targeted for increasing the inventory turnover for a particular merchant or class of merchants. Hence, it uses a list that begins with existing high spending/highly profitable consumers of the merchant and progressively includes more consumers depending on the merchant desire for increased demand or depth of inventory. FIG. 8 is a flowchart of a method 800 for processing data according to an exemplary concentric circles algorithm. In step 802, a subset of all the transactions for the given merchant and/or location going back as far as possible (for example, a period of 12 months if available, but preferably 3-5 years if system resources available are adequate to handle the processing load) is identified. This identifies a subperiod, such as days, months, seasons, etc.

In step 804, transaction information is summarized per consumer to include the sum of the amount spent, number of transactions and profitability (if available) by each subperiod. The sub-period size will increase with the money value of the average transaction.

In step 806, consumer demographic, personal, financial, and summarized transaction history information is added for each consumer in the list.

In step 808, physical distance (e.g., as a crow flies, or using surface transportation) from the customer to the merchant is added to the algorithm, using cartographic information and/or electronic information wherever available.

Figure 9:
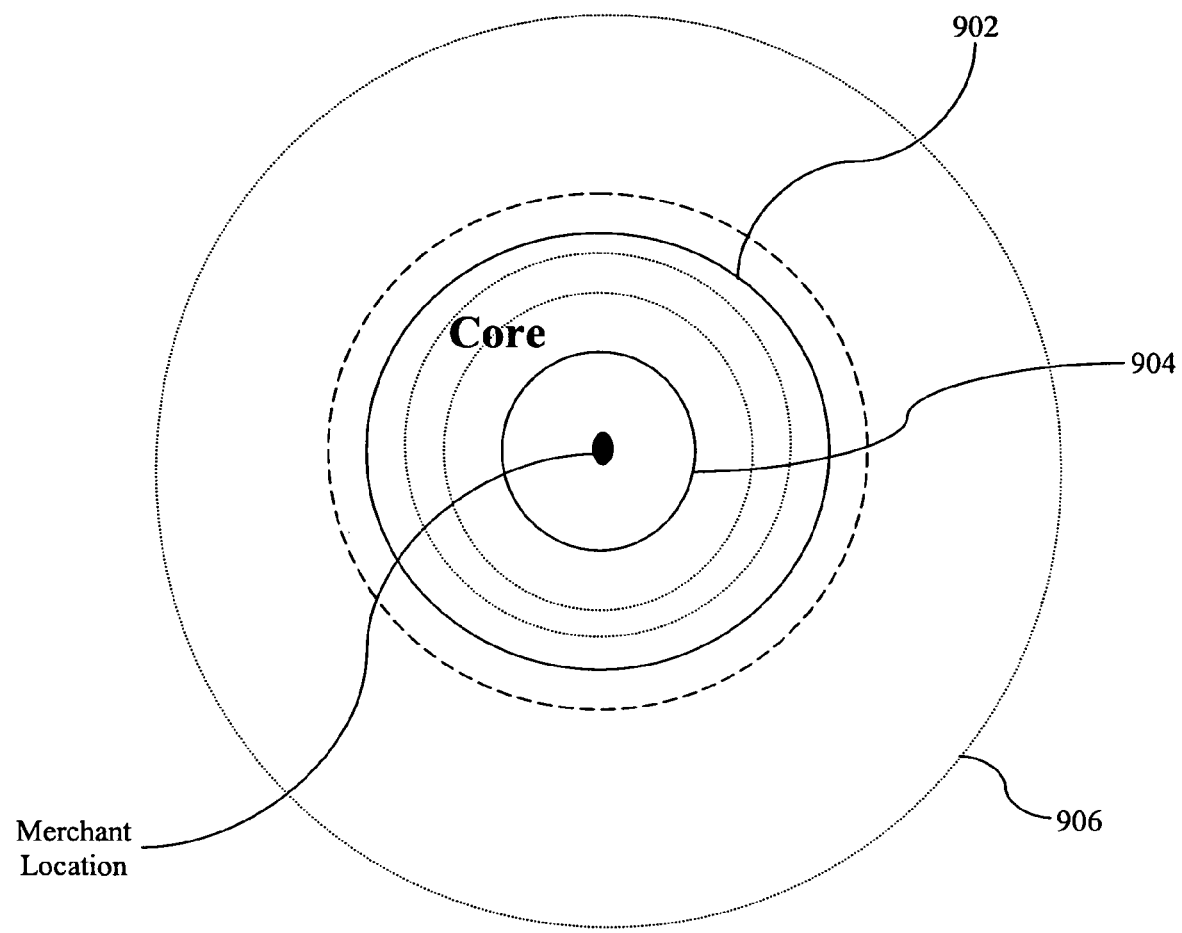
FIG. 9 is an illustration of an example result from the method of FIG. 8.

In step 810, the customer list is sorted by, for example, latest sub-period first, with money spent, number of transactions, profitability (when available), transactions during low demand, transactions during high demand, and physical distance from the merchant (when available) as primary factors. This sorted list is the main or core circle of consumers to which targeted offers for the merchant may be made with a higher probability of success. If the analysis is performed by, for example, a transaction card provider, the sorted list may identify the customers most likely to take advantage of a joint offer between the merchant and the transaction card provider. These core consumers are illustrated by core concentric circle 902 in FIG. 9.

In step 812, within core circle 902, additional concentric circles are defined. Each concentric circle corresponds to each partition of consumers sorted by amount spent in the latest sub-periods with the merchant.

In step 814, each of the groups defined in step 812 are further sorted and ranked based on the volume of transactions within low and high demand periods as well as physical distance from the merchant. The groups thus formed have the inner circles populated by consumers with higher probability of responding to a targeted offer to transact with the merchant during low-demand/low-turnover periods. Group 904 in the innermost circle corresponds to the customers most likely to respond to a discount offer by the merchant.

Figure 10:
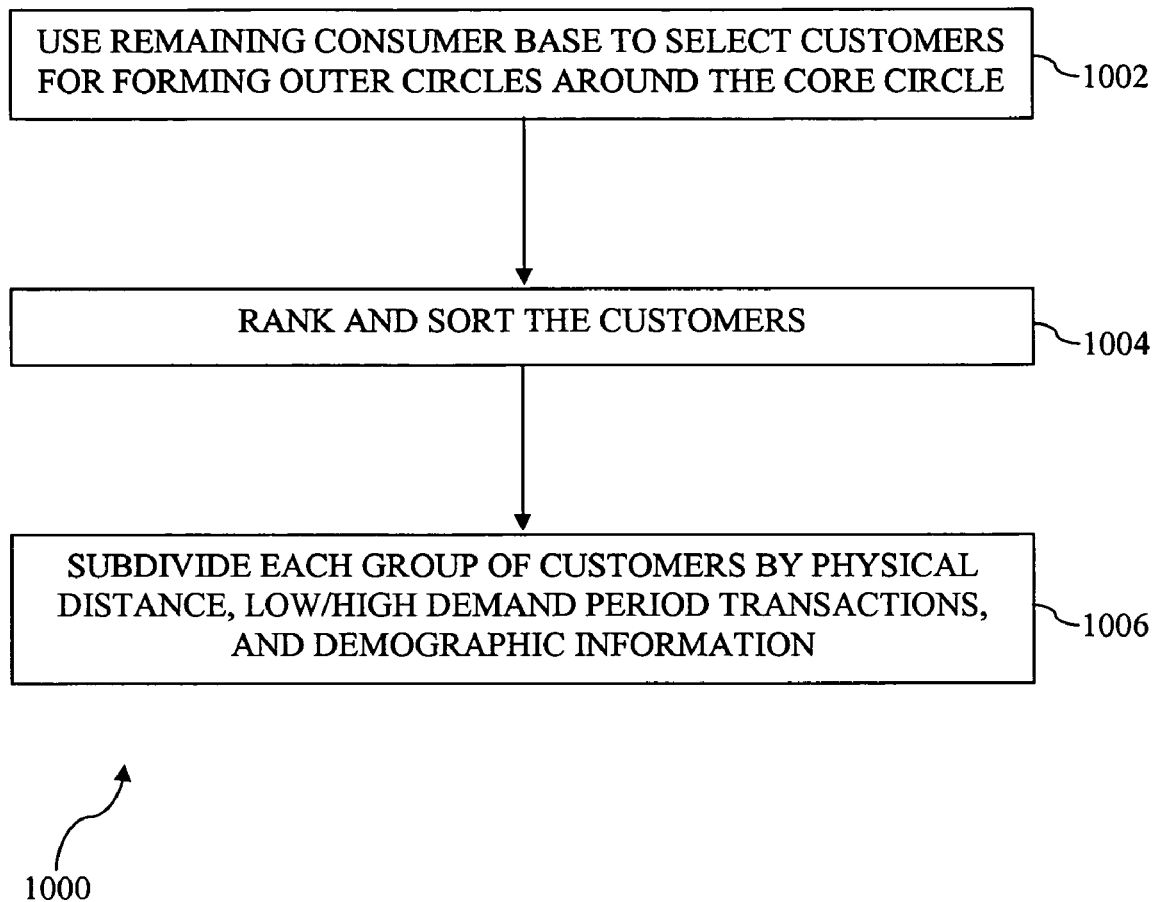
FIG. 10 is a flowchart of a method for further processing data according to an example concentric circles algorithm.

Referring to FIG. 10, an additional method 1000 may be used to target customers for forming outer circles around core circle 902. In step 1002, customers in the customer list that were not included in core circle 902 are selected based on the following example characteristics: transactions (e.g., amount per transaction or number of transactions) with competing merchants in the vicinity and in the direct marketing area ("DMA"), transactions with other competing merchants, transactions with merchants in the same specific industry category (may not be directly competing merchants), and transactions with merchants in complementary industries.

In step 1004, a similar mechanism to method 800 is used to rank and sort these consumers by the above characteristics, starting with amount and number of transactions with competing merchants in the latest sub-periods, in the same industry category and in the complementary industry categories.

In step 1006, each of the groups is subdivided by physical distance from the merchant, low/high demand period transactions, and/or demographic information, which is used more specifically while grouping within consumers having activity in the complementary industry category in the latest sub-periods. The consumers which do not belong to any of these circles form outermost circle 906, and represent the customers least likely to respond to the merchant offer to use the low demand/low turnover period.

Additional factors may be included in the concentric circle formations. For example, response rates from any previous offers may be included. In this example, the algorithm may use scores from econometric models which score all consumers based on responses from earlier targeted offers as a ranking variable. The algorithm may also allow flexibility in choosing the most important factor deciding the innermost concentric circles.

Similar results to the concentric circles algorithm may be achieved using a simple weighted scoring mechanism where the amount, number of transactions, period of transactions, profitability, and physical distance from the merchant are given weights, and a score is calculated for each of the consumers in the consumer list. When this weighted scoring method is used, only the score is used for sorting and ranking the consumers. However, it is found that many merchants prefer the concentric circles grouping because it is more simple and intuitive to understand without involving mathematics. Additionally, the concentric circles model assists visual thinking and allows direct interaction with actual consumer information such as amount spent or physical distance rather than a derived score. The scoring method is more useful while working with merchants having multilocation or chain operations with a large number of locations, who require a more computer intensive mechanism than a visual and intuitive mechanism.

Using the consumer groups identified by the consumer algorithm, the merchant can determine which consumer groups should be targeted. In a practical example of the concentric circles algorithm, a classical music store merchant may need to target customers for weekday morning low-demand periods. In this example, 24 million cardmembers are included in network 102. Out of those 24 million, only 12 million are actively spending each month. Within that group, only 6 million buy music. Within that group, only 2 million purchase classical music. Within that group, there is a subset of 500,000 who make multiple classical music purchases in a month. Of that group, only 5,000 cardmembers shop in the same area as the classical music store. Of that group, only 500 cardmembers regularly shop on weekday mornings. Thus, using the concentric circles algorithm, those 500 people most likely to buy classical music in the area on weekday mornings can be specifically targeted by the merchant without wasting marketing efforts on those not likely to buy classical music in the area on weekday mornings.

Once the cardmembers most likely to accept an offer by the merchant have been identified, they are targeted with the discount offer from the merchant. The cardmembers' information can be analyzed to determine appropriate channels for communicating the merchant's offer to the targeted cardmembers. The channel may be based on individual cardmember preferences, and may include, for example and without limitation, direct mail, email, and telephone calls.

Since the discount offer is targeted to the cardmembers most likely to accept the offer, a higher rate of acceptance is achieved as compared to broad-based techniques. Once offers have been accepted, information about the cardmembers who accept the offer and their transaction data can be added to data mart 304 to further enhance the targeting process.

Figure 11:
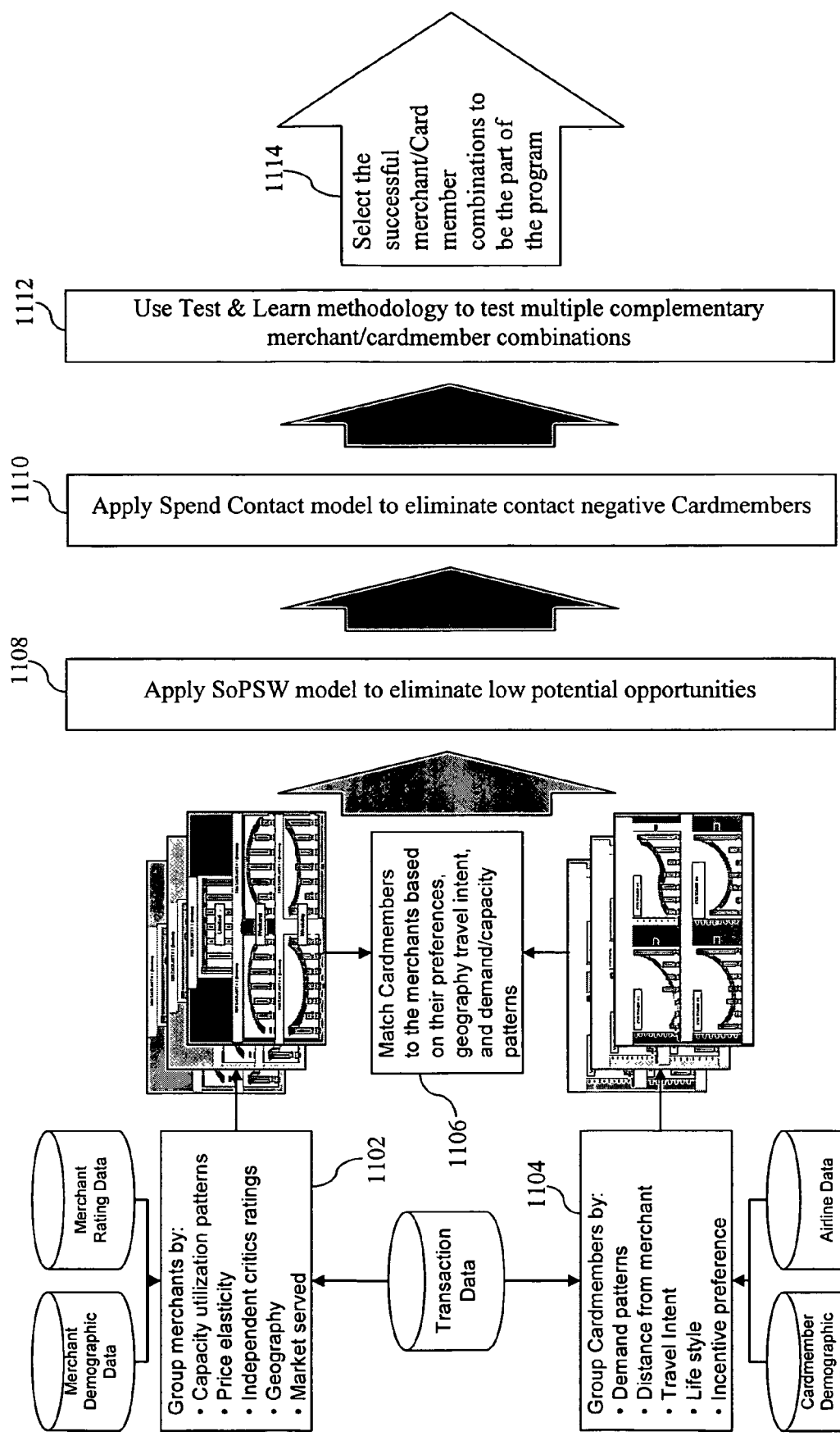
FIG. 11 is a flowchart of a method for targeting customers.

FIG. 11 is a flowchart of another example method for targeting customers. In step 1102, transaction data, merchant demographic data, and external ratings data are analyzed to classify merchants. Merchants may be classified, for example, by capacity utilization patterns. Merchants have different levels of capacity utilization, which may be based on location, time of day, day of the week, or seasons. In another example, merchants may be classified by the merchant's response to low demand. This is also referred to as price elasticity and takes into consideration that some merchants reduce prices during low-demand periods while others tend to maintain prices to protect the brand image. Merchants may also be classified based on how they are rated by independent critics, geography, and/or the markets served by the merchant.

In step 1104, transaction data is combined with customer demographic data and, for example, airline data to classify the customers. Customers may be classified by demand patterns, since customers may have preferences to shop during specific time slots, on certain days of the week, or during a particular season. Customers may also be frequent shoppers or non-frequent shoppers. Customers may also be classified by their distance from the merchant, and coordinates of the customer and merchant can be used to calculate the distance. Customers may be classified based on their travel intent. Airline data, for example, may be used to identify which customers are traveling where and when. Customers may be classified based on lifestyle, such as whether they prefer upscale or economy merchants, their age, or how many children they have. Additionally or alternatively, customers may be classified based on their incentive preferences, such as whether the customer responds to discount incentives or experience incentives.

In step 1106, customers are matched with merchants based on their preferences, geography, travel intent, and/or demand/capacity patterns.

In step 1108, a size of spending model is applied to determine how much spend potential the customer has. Customers having the lowest spend potential are eliminated from the inventory turnover targeting program. An example spending model that may be used in conjunction with the present invention is discussed in U.S. patent application Ser. No. 10/978,298, filed Oct. 29, 2004, and titled "Method and Apparatus for Estimating the Spend Capacity of Consumers," which is incorporated by reference herein in its entirety.

In step 1110, a spend contact model is applied to determine customers whose spend declines in response to solicitation. These customers are also eliminated from the inventory turnover targeting program.

In step 1112, merchants and customers are grouped based on complementary demand/capacity patterns, customer lifestyle, merchant ratings/characteristics, and/or geographic proximity (e.g., the customer is either living or will be traveling to a location close to the merchant during the promotion period). Based on the incentive preferences of the customer, multiple levels of incentive may be tested using test and learn methodology. The merchant-specific test is then fielded.

In step 1114, based on the test results, the most successful combinations are selected that meet financial hurdles for both the merchant and a financial company controlling the closed loop network. The final discount offer program is based on these combinations to enhance return on investment for the merchant and provide discounted price and/or a preferred experience to the consumer.

This type of customer targeting offers a powerful marketing tool that can be used in many permutations. For instance, the method can be altered to include data from complementary merchants. In an example complementary merchant scenario, most customers book airline flights several weeks in advance. The airline flight information can be used to determine a particular area that the customer may be visiting. Based on other transaction data related to the customer's transaction account, it may be determined that the customer likes to eat at a particular type of restaurant. The customer can then be targeted by a restaurant of the preferred type at the location to which the customer is flying who may be experiencing a low-demand period at the time of the customer's visit.

Customer targeting need not be restricted to complementary industry targeting. If there is high demand for a particular product or service produced by one company, and low demand for a product or service of similar quality in a similar location by a second company, customers may be offered a discount for purchases made from the second company. The customers benefit, because they are given the option of purchasing a similar item from an alternative company that the customers may not have been aware of. The second company also benefits because, even with the discount, the second company reduces its excess inventory.

Recommendations may also be made based primarily on consumer transaction information. A customer may make a purchase from a particular merchant. Data mart 304 may then be searched to determine other customers who also made a purchase from the same merchant. Once these additional customers are identified, their transaction data can be analyzed to determine a set of merchants most often used by those additional customers. The original customer may then be targeted by the set of merchants. For example, if a customer makes a purchase at a particular restaurant, other customers who made purchases at the same restaurant are identified. The most popular restaurants in the same location that the original customer might enjoy can be ranked based on the additional customer transaction information. The original customer can then be targeted with offers from those additional restaurants.

Such systems and methods may be utilized by a financial company, such as a transaction card provider, who operates a network such as network 102. These systems and methods (or any part(s) or function(s) thereof) may be implemented using hardware, software or a combination thereof, and may be implemented in one or more computer systems or other processing systems. However, the manipulations performed by the methods and systems disclosed herein were often referred to in terms, such as adding or comparing, which are commonly associated with mental operations performed by a human operator. No such capability of a human operator is necessary, or desirable in most cases, in any of the operations described herein which form part of the present invention. Rather, the operations may be machine operations. Useful machines for performing the operation of the present invention include general purpose digital computers or similar devices.

Figure 12:
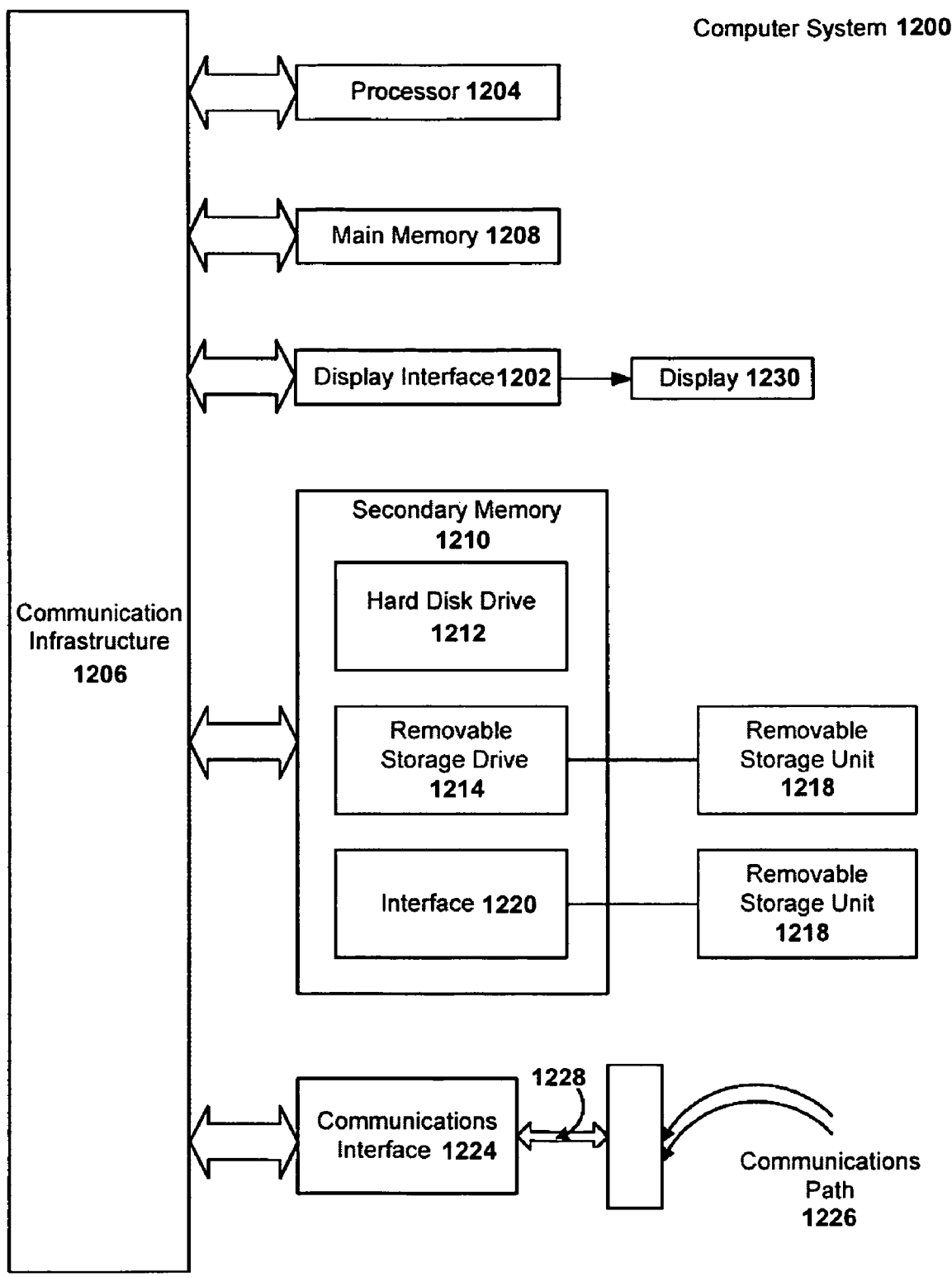
FIG. 12 is a block diagram of an exemplary computer system useful for implementing the present invention.

In fact, in one embodiment, the invention is directed toward one or more computer systems capable of carrying out the functionality described herein. An example of a computer system 1200 is shown in FIG. 12.

The computer system 1200 includes one or more processors, such as processor 1204. The processor 1204 is connected to a communication infrastructure 1206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1200 can include a display interface 1202 that forwards graphics, text, and other data from the communication infrastructure 1206 (or from a frame buffer not shown) for display on the display unit 1230.

Computer system 1200 also includes a main memory 1208, preferably random access memory (RAM), and may also include a secondary memory 1210. The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218 represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 may include other similar devices for allowing computer programs or other instructions to be loaded into computer system 1200. Such devices may include, for example, a removable storage unit 1218 and an interface 1220. Examples of such may include a program cartridge and cartridge interface (such as that found in video game devices), a removable memory chip (such as an erasable programmable read only memory (EPROM), or programmable read only memory (PROM)) and associated socket, and other removable storage units 1218 and interfaces 1220, which allow software and data to be transferred from the removable storage unit 1218 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a Personal Computer Memory Card International Association (PCMCIA) slot and card, etc. Software and data transferred via communications interface 1224 may be in the form of signals 1228 which may be electronic, electromagnetic, optical or other signals capable of being received by communications interface 1224. These signals 1228 are provided to communications interface 1224 via a communications path (e.g., channel) 1226. This channel 1226 carries signals 1228 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1214, a hard disk installed in hard disk drive 1212, and signals 1228. These computer program products provide software to computer system 1200. The invention is directed to such computer program products.

Computer programs (also referred to as computer control logic) are stored in main memory 1208 and/or secondary memory 1210. Computer programs may also be received via communications interface 1224. Such computer programs, when executed, enable the computer system 1200 to perform the features of the present invention, as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

III. Conclusion

Thus, the entire transaction data set is used to identify lower transaction periods by determining the locations, time periods, industries, and merchants having a lower demand, lower inventory turnover, and/or lower utilization of fixed capacity. Groups of merchants with similar, opposite, and/or complementary demand patterns are then identified. Using the merchant groups, consumers are also grouped by location, time period, industry, and past or potential transactions with these merchant groups. The groups are then matched to make targeted consumer offers to increase the demand and increase the inventory turnover or capacity utilization. The same process is also used to shift the demand between time periods, merchants, and locations as well as to control the demand patterns using calibrated offers and to fine-tune the number of consumers targeted. The process is applied with higher precision using product level transaction data from POS terminals used by merchants wherever available.

This solves the problem by bringing together unused or wasted inventory, not only of producers and retailers but also of service establishments where empty merchant establishments drag down the overall economic output. A financial company controlling the network through which the transactions are made, such as a transaction card provider, may also benefit from this solution. Benefits may be realized through, for example, increased discount revenue, a higher satisfaction level by cardmembers, improved merchant and consumer experience, increased returns on data collection, management, and analysis investments, increased demonstration of competitive advantages of the closed loop network, and increased justification for higher discount rates charged to merchants. At an individual level, this system and method result in the merchant earning more by increasing the utilization of the merchant's manufacturing, service, or retail establishment for which he is incurring fixed costs all the time. Merchants also benefit from increased capacity utilization, increased inventory turnover, higher pricing power based on increased demand management, and better targeted customer offers. Cardmembers benefit from better products and services at lower prices from merchants of choice. Manufacturers benefit from better inventory management, seasonal demand management, and the possibility of joint offers with merchants and the financial company. Others benefit from the economy-wide higher utilization of inventory, lower wastages due to unused capacities or unsold inventories, higher productivity, higher tax revenues for the government, and quicker adjustment of merchants and consumers to economic downturns and recessions.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method, comprising:
   collecting, by a computer based system for tailored marketing of consumers, merchant data, consumer data, and transaction data;
   identifying, by the computer based system, a period of excess inventory of a merchant based on the merchant data;
   identifying, by the computer based system, customers likely to respond to tailored marketing for the merchant based on the consumer data and the transaction data; and
   sorting, by the computer based system and according to a concentric circles algorithm, the identified customers based on the likelihood of the customers to respond to the tailored marketing for the merchant, wherein the concentric circles algorithm comprises:
   identifying, by the computer-based system, a first group of the merchants identified customers based upon a first spending amount;
   identifying, by the computer-based system, a second group of the merchant's identified customers based upon a second spending amount, wherein the second spending amount is less than the first spending amount, and wherein the second group of the merchant's identified customers includes the first group of the merchant's identified customers; and
   selecting for tailored marketing, by the computer-based system, the second group of the merchant's identified customers based upon the merchant's desire for increased demand during the period of excess inventory.

2. The method of claim 1, wherein the identifying the period of excess inventory comprises identifying, by the computer-based system, dates and times that the merchant posts the least revenue.

3. The method of claim 1, wherein the identifying the period of excess inventory comprises identifying, by the computer-based system, demand patterns of merchants having a customer base similar to a customer base of the merchant.

4. The method of claim 1, further comprising:
   contacting, by the computer-based system, the merchant to offer tailored marketing opportunities.

5. The method of claim 1, further comprising integrating, by the computer-based system, point of sale data from the merchant into the merchant data.

6. The method of claim 1, wherein the identifying customers comprises determining, by the computer-based system, customer spending patterns related to an industry of the merchant.

7. The method of claim 6, wherein the identifying customers further comprises analyzing, by the computer-based system, the customer spending patterns based on data from at least one of a competing merchant or a complementary merchant.

8. The method of claim 1, wherein the sorting further comprises:
   identifying, by the computer-based system, transactions for the merchant over a maximum period of time, wherein the maximum period of time comprises a subperiod;
   summarizing, by the computer-based system, the identified transactions to include the sum of the amount spent per identified customer and the number of transactions per identified customer for the subperiod;
   determining, by the computer-based system, demographic information and financial information for each identified customer;
   determining, by the computer-based system, physical distance from each identified customer to the merchant; and
   sorting, by the computer-based system, the identified customers based on the transaction summary, demographic information, financial information, and physical distance for each identified customer.

9. The method of claim 8, wherein the sorting further comprises:
   further sorting, by the computer-based system, the identified customers based on volume of transactions of each identified customer within low and high demand periods.

10. The method of claim 9, wherein the sorting further comprises:
    further sorting, by the computer-based system, the identified customers based on at least one of: transactions of the identified customers with competing merchants in the vicinity and direct marketing area of the merchant; transactions of the identified customers with all competing merchants; transactions of the identified customers with merchants in a same industry category as the merchant; or transactions of the identified customers with merchants in complementary industries.

11. The method of claim 1, wherein the sorting step further comprises:
sorting, by the computer-based system, customers according to a weighted scoring mechanism.

12. The method of claim 11, wherein the sorting further comprises:
assigning, by the computer-based system, a weight to each of: a transaction amount per identified customer, a number of transactions per identified customer, and physical distance from each identified customer to the merchant;
assigning, by the computer based system, a value for each identified customer to each of: the transaction amount per identified customer, the number of transactions per identified customer, and the physical distance from each identified customer to the merchant;
determining, by the computer-based system, a score for each customer based on the assigned weights and values; and
sorting, by the computer-based system, the identified customers based on the score for each identified customer.

13. A system, comprising:
a processor for tailored marketing of consumers;
a tangible, non-transitory memory configured to communicate with the processor,
the tangible, non-transitory memory having instructions stored thereon that, in response to execution by the processor, cause the processor to perform operations comprising:
collecting, by the processor, merchant data, consumer data, and transaction data;
identifying, by the processor, a period of excess inventory of a merchant based on the merchant data;
identifying, by the processor, customers likely to respond to tailored marketing for the merchant based on the consumer data and transaction data; and
sorting, by the processor and according to a concentric circles algorithm, the identified customers based on the likelihood of the customers to respond to tailored marketing for the merchant, wherein the concentric circles algorithm comprises:
identifying, by the processor, a first group of the merchant's identified customers based upon a first spending amount;
identifying, by the processor, a second group of the merchant's identified customers based upon a second spending amount, wherein the second spending amount is less than the first spending amount, and wherein the second group of the merchant's identified customers includes the first group of the merchants identified customers; and
selecting for tailored marketing, by the processor, the second group of the merchant's identified customers based upon the merchants desire for increased demand during the period of excess inventory.

14. The system of claim 13, wherein the identifying a period of excess inventory comprises identifying, by the processor, dates and times that the merchant posts the least revenue.

15. The system of claim 13, wherein identifying a period of excess inventory comprises identifying, by the processor, demand patterns of merchants having a customer base similar to a customer base of the merchant.

16. The system of claim 13, further comprising contacting, by the processor, the merchant to offer tailored marketing opportunities.

17. The system of claim 13, further comprising integrating, by the processor, point of sale data from the merchant into the merchant data.

18. The system of claim 13, wherein the identifying customers comprises determining, by the processor, customer spending patterns related to an industry of the merchant.

19. The system of claim 18, wherein the identifying customers further comprises analyzing, by the processor, the customer spending patterns based on data from at least one of a competing merchant or a complementary merchant.

20. The system of claim 13, wherein the sorting further comprises:
identifying, by the processor, transactions for the merchant over a maximum period of time, wherein the maximum period of time comprises a subperiod;
summarizing, by the processor, the identified transactions to include the sum of the amount spent per identified customer and the number of transactions per identified customer for the subperiod;
determining, by the processor, demographic information and financial information for each identified customer;
determining, by the processor, physical distance from each identified customer to the merchant; and
sorting, by the processor, the identified customers based on the transaction summary, demographic information, financial information, and physical distance for each identified customer.

21. The system of claim 20, wherein sorting further comprises: further sorting the identified customers based on at least one of: volume of transactions of each identified customer within low and high demand periods; transactions of the identified customers with competing merchants in the vicinity and direct marketing area of the merchant: transactions of the identified customers with all competing merchants; transactions of the identified customers with merchants in a same industry category as the merchant; or transactions of the identified customers with merchants in complementary industries.

22. The system of claim 13, wherein the sorting comprises: sorting, by the processor, customers according to a weighted scoring mechanism.

23. The system of claim 22, wherein the sorting comprises:
assigning, by the processor, a weight to each of: a transaction amount per identified customer, a number of transactions per identified customer, and physical distance from each identified customer to the merchant;
assigning, by the processor, a value for each identified customer to each of: the transaction amount per identified customer, the number of transactions per identified customer, and the physical distance from each identified customer to the merchant;
determining, by the processor, a score for each customer based on the assigned weights and values; and
sorting, by the processor, the identified customers based on the score for each identified customer.

24. An article of manufacture including a non-transitory, tangible computer readable storage medium having instructions stored thereon that, in response to execution by a computer-based system for tailored marketing of consumers, cause the computer-based system to perform operations comprising:
collecting, by the computer based system, merchant data, consumer data, and transaction data;

identifying, by the computer based system, a period of excess inventory of a merchant based on the merchant data;

identifying, by the computer based system, customers likely to respond to tailored marketing for the merchant based on the consumer data and transaction data; and sorting, by the computer based system and according to a concentric circles algorithm, the identified customers based on the likelihood of the customers to respond to tailored marketing for the merchant, wherein the concentric circles algorithm comprises:

identifying, by the computer-based system, a first group of the merchants identified customers based upon a first spending amount;

identifying, by the computer-based system, a second group of the merchant's identified customers based upon a second spending amount, wherein the second spending amount is less than the first spending amount, and where the second group of the merchant's identified customers includes the first group of the merchant's identified customers; and selecting for tailored marketing, by the computer-based system, the second group of the merchant's identified customers based upon the merchant's desire for increased demand during the period of excess inventory.

* * * * *